May 6, 1952 — H. S. CAHEN — 2,595,512
APPARATUS FOR LIGHTING CIGARETTES AND THE LIKE
Filed April 19, 1947 — 3 Sheets-Sheet 1

INVENTOR.
HERMAN S. CAHEN
BY
Milburn & Milburn

May 6, 1952        H. S. CAHEN        2,595,512
APPARATUS FOR LIGHTING CIGARETTES AND THE LIKE
Filed April 19, 1947        3 Sheets-Sheet 2
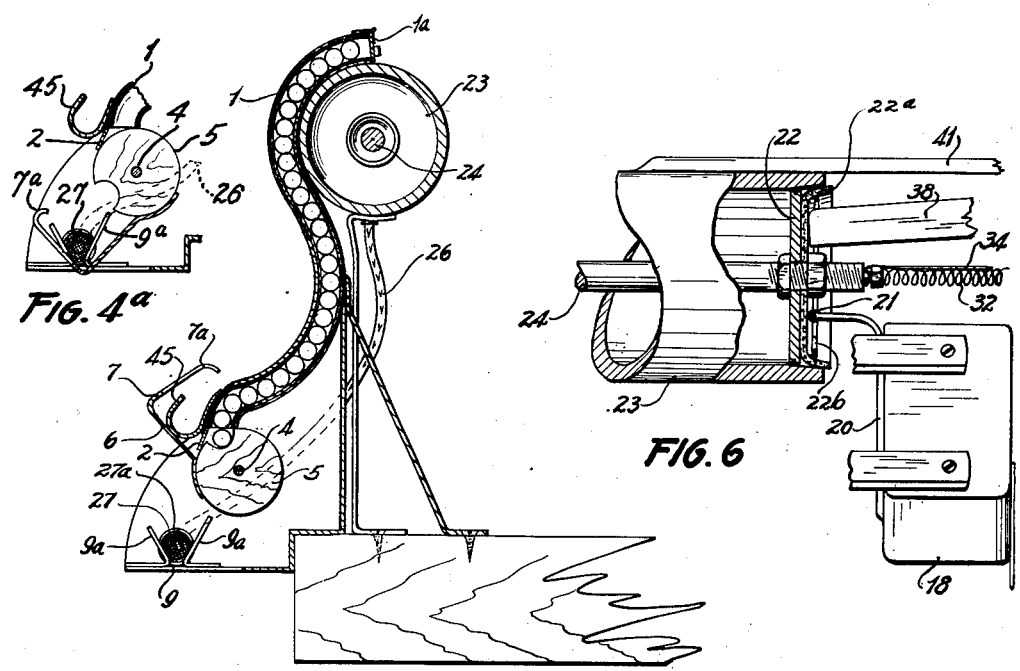
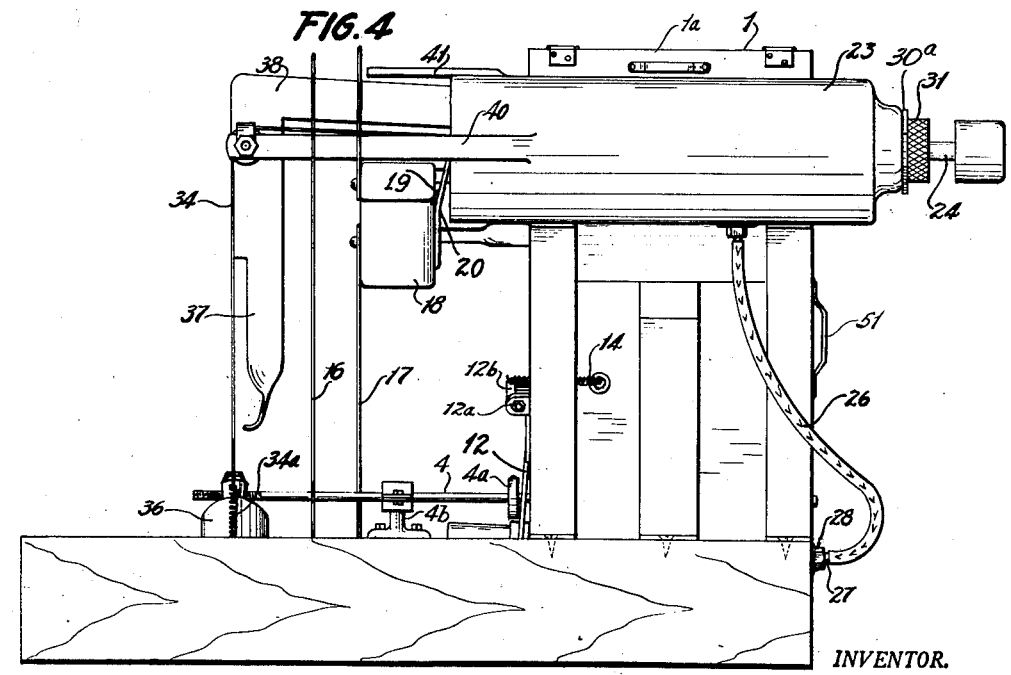
INVENTOR.
HERMAN S. CAHEN May 6, 1952 H. S. CAHEN 2,595,512
APPARATUS FOR LIGHTING CIGARETTES AND THE LIKE
Filed April 19, 1947 3 Sheets-Sheet 3

INVENTOR.
HERMAN S. CAHEN
BY
Milburn & Milburn

Patented May 6, 1952

2,595,512

UNITED STATES PATENT OFFICE 2,595,512

APPARATUS FOR LIGHTING CIGARETTES AND THE LIKE

Herman S. Cahen, University Heights, Ohio

Application April 19, 1947, Serial No. 742,717

2 Claims. (Cl. 312—48)

This invention relates to an improved device for lighting a cigarette and is adapted for installation in an automobile or elsewhere, particular emphasis being here placed upon its use by the driver of an automobile.

Everyone is, of course, familiar with the pocket lighter which is carried by many smokers; but, in the use of such a lighter, especially by the driver of an automobile, he must remove the cigarette and lighter from his pocket and then apply the flame of the lighter to the cigarette for a sufficiently long time to light the same. All this procedure, of course, requires the attention of the driver and hence must divert his attention from the driving of the automobile.

Also, many automobiles are equipped with an electric lighter upon the dash-board but this must first be energized to red-heat and then it must be applied to the cigarette for sufficiently long time for lighting the same, with the consequent diverson of the driver's attention.

Thus, in both instances above mentioned, there is always the danger of the driver losing control of the automobile and possibly incurring an accident even during such a brief interval of time, especially if the automobile is being driven at a high rate of speed.

Accordingly, the object of my present invention is to devise an appliance which may be installed in an automobile or elsewhere and which may be used by the driver of an automobile, for instance, for lighting a cigarette without requiring any appreciable diversion of his attention from the operation of the automobile.

A more specific object is to devise an appliance in which a supply of cigarettes may be stored and which may be manipulated so as to position the cigarettes one at a time in proper relation to a lighting means and to light the same in an effective manner so as to be readily accessible to the driver of the automobile; and in which the sequence of operations may be initiated by a single and simple manipulation by the driver, without requiring his attention to be diverted from the operation of the automobile.

Another object is to devise such an appliance in which a single and simple momentary manipulation by the driver of an automobile will serve to position a cigarette with its one end in effective position with respect to a lighting means, will energize the lighting means, will subject the other end of the cigarette to suction so as to thereby promote the lighting operation, and then suitably position the lighted cigarette within easy reach of the driver.

Another object is to devise such an appliance in which the lighting means at one end of the cigarette will be energized for a predetermined and sufficient length of time prior to the application of suction to the other end of the cigarette.

Another object is to devise such an appliance in which the operation of positioning a cigarette for lighting, will serve automatically also to energize the lighting means itself and will cock the device for automatic termination of such energization of the lighting means after a predetermined period of time.

Another object is to devise such an appliance in which the several successive operations will be initiated and performed in proper sequence as a result of one simple manipulation by the automobile driver and in which the several parts will be returned automatically to their original idle positions to await subsequent operation in the same manner whenever desired.

Another object is to devise such an appliance in which cigarettes of different lengths may be used.

Another object is to provide such an appliance with a suitable housing for the supply of cigarettes, so constructed and arranged that the cigarettes may be fed therefrom one at a time for lighting.

Another object is to provide such an appliance with an improved means for positioning and engaging the end of the cigarette in proper relation to the means for lighting the same.

Other objects will appear from the following description and claims when considered together with the accompanying drawings.

Fig. 4 is a view taken on line 4—4 of Fig. 2;

Fig. 4a is a partial view of the structure shown in Fig. 4 but in another position according to the manner of operation;

Fig. 5 is an elevation taken at 180 degrees to Fig. 2;

Fig. 6 is a view showing parts associated with the one end of the plunger which is shown in section;

Figure 1:
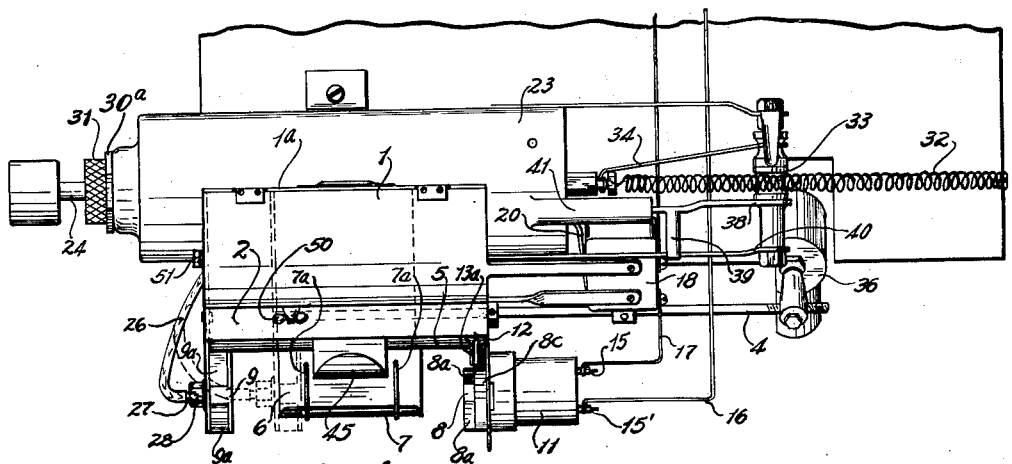
Fig. 1 is a top plan view of my present appliance.

It is to be understood that the disclosure of the present form of device is merely for the purpose of illustration and that there might be devised various modifications thereof without departing from the spirit of my invention as herein set forth and claimed.

The entire contents of a pack of cigarettes, that is twenty or so, may be removed therefrom and placed one above the other within the curved form of chute or container 1 so that they may be fed therefrom by gravity one at a time upon operation of the present device. This chute or magazine should preferably be in the form of a substantially moisture-proof enclosure in order to prevent the cigarettes from becoming too dry before being used. Such an arrangement must include a means for permitting discharge of the lower-most cigarette and automatically closing the lower end of the chute thereafter. For this purpose, the chute 1 itself may be made of moisture-proof material, with a substantially moisture-proof closure 1a at the top or side thereof and a hinged flap closure 2 of like material so mounted at the outlet end of the container as to normally occupy closed position, by means of either gravity or a spring means, but adapted to be opened momentarily by engagement of the cigarette therewith as it is about to be discharged by the carrier 5 on shaft 4. If so desired, there may be a projection upon the end of carrier 5 for opening engagement with the closure 2 as the carrier moves to discharge a cigarette.

It may be preferable to provide the closure 1a upon the side of the chute or magazine 1 so as to facilitate the placing of the cigarettes in proper stacked arrangement within the same and without danger of the cigarettes becoming cocked as they are being placed in the container.

Fixed upon rotatable shaft 4 is the longitudinally grooved carrier 5 which is positioned beneath the lower end of the chute 1 so as to receive and support the lower-most cigarette of those within the chute. In fact, the carrier 5 constitutes the bottom of the chute 1 and is so constructed and arranged that, in one position, it will receive and hold the lower-most cigarette and, upon rotation to its other position, will release the bottom cigarette to the force of gravity so as to roll therefrom; while, at the same time, the rear wall of the carrier 5 will be moved into position closing the lower end of the chute 1 so as to permit only one cigarette at a time to escape and to hold the other cigarettes within the chute. The bottom cigarette, upon being released, will roll down the apron 6 which is attached to the carrier 5 so as to form an extension thereof and which has its outer or lower end curved upwardly into a trough 7 to receive and hold the cigarette which rolls down from the carrier 5. The wall 5a, at the one end of the carrier 5, will serve as part of a guide means for operative engagement by the cigarette as it rolls from the carrier 5. When the carrier 5 occupies raised position, the longitudinal groove thereof is inclined upwardly and outwardly sufficiently to hold the lower-most cigarette beneath the others in the chute or container 1. During such feeding of the bottom cigarette to position for lighting of the same, the shaft 4 and carrier 5 are rotated approximately ninety (90) degrees. The trough 7 has inwardly curved over-hanging guard wires 7a to prevent the cigarette from escaping from the trough 7 by rolling therebeyond.

The trough 7 extends through only the middle part of the length of the cigarette so as to leave both end portions thereof free; and, before the shaft 4 reaches its limit of movement, the two ends of the cigarette carried by the apron 7 are deposited upon the ledges 8 and 9 which have the upwardly diverging guides or throat means 8a and 9a, respectively, to ensure proper positioning of the cigarette. The one end of the cigarette, beyond the ledge 8, is so positioned as to be in proper registry with the electric resistance coil 10 for lighting the cigarette, the coil 10 being mounted upon the electric insulation body 11.

The body 11 is mounted upon the bracket 12 which, in turn, is mounted about the shaft 4 between the frame and the fixed collar 4a upon the shaft 4. The bracket 12 serves also as a guide wall for the other end of the cigarette and in this respect co-operates with the wall 5a at the mouth end of the cigarette. Bracket 12 has a projection 13 for engagement by the cam 13a on the cigarette carrier 5 so as to thereby move the lower end of the bracket 12 and the body 11 inwardly during the last part of the rotation of shaft 4 and after the cigarette has been deposited in position for lighting the same in the manner above described. The upper end of bracket 12 is normally influenced by a coil spring 14 so as to force the body 11 and the coil 10 outwardly away from the end of the cigarette. The bracket 12 has a projection 12b pivotally mounted at 12a upon the frame of the device in order to prevent the bracket 12 from turning about the shaft 4 while permitting movement of the lower end of the bracket in the manner described. Such inward movement of the body 11, immediately after positioning of the cigarette for lighting, will ensure most effective operative engagement of the coil 10 with the end of the cigarette to be lighted.

I have shown the coil 10 as being doubled upon itself in spiral form and with its two ends extending from diametrically opposite points for connection to their two terminals 15 and 15' provided in the body 11. Thus there is no terminal at the center of the coil and consequently most efficient lighting may be obtained; and, with this same end in view, the coil is made of approximately the same diameter as that of the cigarette. This coil may consist of "Nichrome" or other suitable composition of wire. I have provided also the fine parallel wires 10a extending diametrically and vertically across the coil 10 for the purpose of preventing actual engagement of the cigarette with the coil 10 and transfer of particles of tobacco from the end of the cigarette to the coil. Also, between the ledge 8 and the coil 10, there is provided a trough 8c which will receive any particles of tobacco which may become loosened from the cigarette and will thus prevent the accumulation of the same upon the coil 10.

The electric wire 16 is connected to the one terminal 15' while the other end thereof may be connected to a transformer, if such be required, or to the electric current supply line. The other terminal 15 has connected thereto an electric wire 17 which extends to one side of the electric switch 18 which has an electric wire connection from the other side thereof to the transformer or direct to the electric current supply line. The purpose of the switch 18 is to control the energization of the resistance coil 10. The provision of two wires and a transformer is for use in the home or office, whereas a single wire is used in the case of installation upon the dash board of an automobile.

The electric switch 18, which may be of conventional form, has the operating spring pin 19 extending therefrom into the path of the leaf spring 20 which has its one end mounted upon the body of the switch 18 and extends therealong over the pin 19 and has a roller 21 mounted upon its free end for operative arrangement with respect to the reciprocatable plunger 22 in the cylinder 23. The switch 18 is adapted to be closed by the outward movement of the spring pin 19 and to be opened by the inward movement thereof; and the leaf spring 20 has a normal tendency to move outwardly away from the switch body 18 so as to free the pin 19 for closing the switch. The movement of the plunger 22 towards the right-hand end of the cylinder 23, as viewed in Figs. 2 and 8 for instance, will cause the spring 20 to force the pin 19 inwardly to open the switch. When the device is not in use, the plunger 22 will rest against the roller 21 so as to hold the switch in open position.

Figures 7, 8, 9, 10, 11:
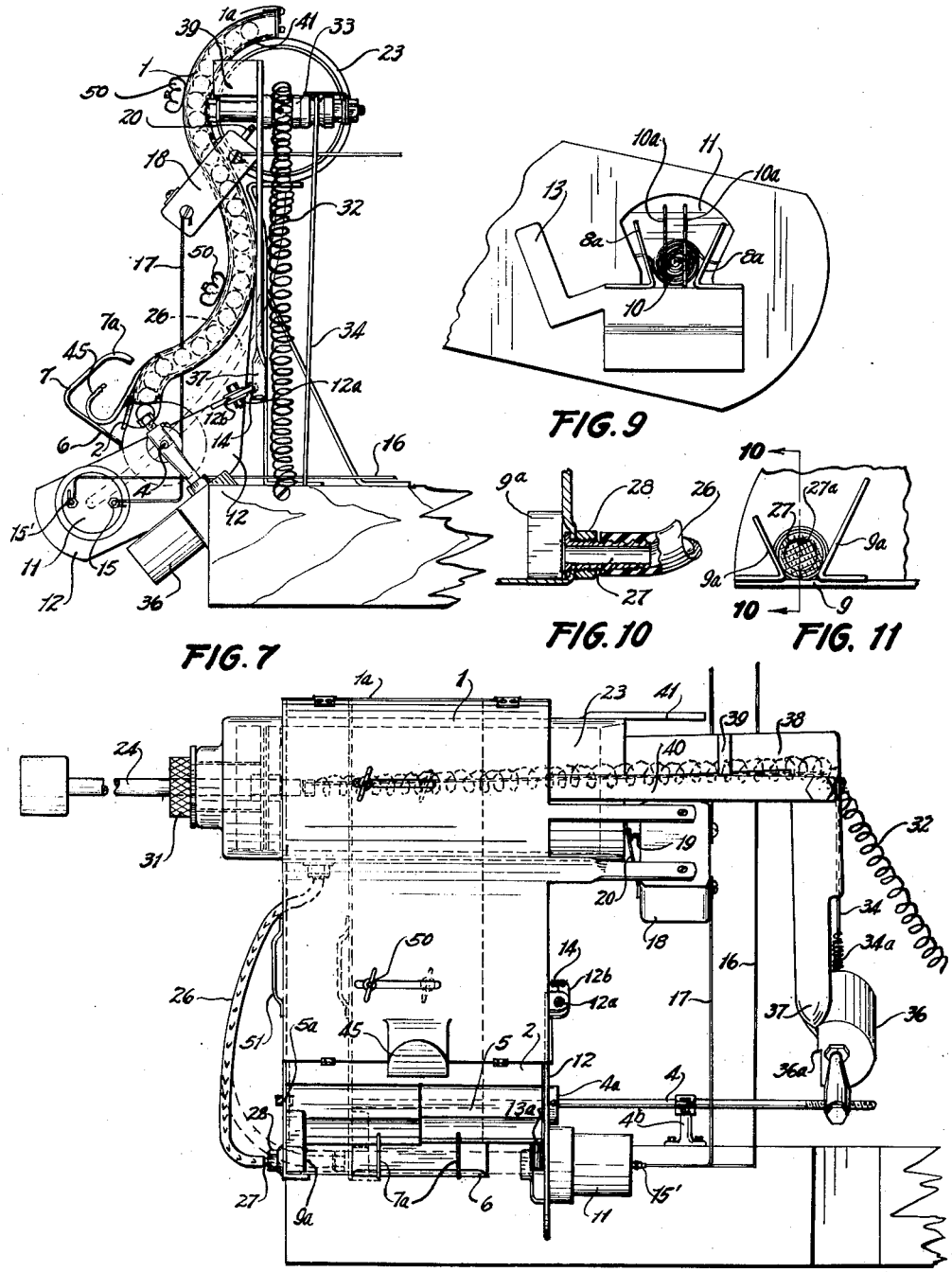
Fig. 7 is an end elevation of my present appliance.
Fig. 8 is a side elevation corresponding to Fig. 2 but showing the parts in operative position.
Fig. 9 illustrates my improved lighting means.
Fig. 10 is a view taken on line 10—10 of Fig. 11.
Fig. 11 illustrates the screen means at one end of the cigarette.

The plunger 22 is adapted to be withdrawn towards the left, as viewed in Fig. 8 for instance, by the rod 24 which is so located as to be readily accessible to the driver of the automobile without changing his position and without diverting his attention from operation of the automobile. As the plunger is withdrawn, the air within the cylinder 23 may escape from the rear side of the plunger by way of the tube 26 which is connected at its other end to a nipple 27 located at the outer side of the ledge 9 so as to be in line with and substantially contiguous to the mouth-end of the cigarette when deposited thereupon in the manner above described. The nipple 27 may be clamped in position by means of the nut 28. After the plunger 22 passes the opening of the tube 26, in its rearward movement, there will be sufficient leakage past the leather facing 22a to permit escape of air from the rear thereof; and the reverse will be true during the return movement of the plunger up to the point of the tube 26.

A screen 27a at the end of the nozzle 27 will prevent particles of tobacco from being drawn into the tube 26.

The tube 26 is connected to the cylinder 23 at such a point near the rear end thereof, which is the left-hand end as viewed in Fig. 8 for instance, that there will be effected proper performance of the functions of this device in the manner intended. Briefly, my purpose is first to place a cigarette in lighting position in the manner above described, then to allow sufficient time for energization of the coil 10 to the point of red heat at one end of the cigarette, and then to produce through the tube 26 a suction at the other or mouth-end of the cigarette so as to thereby simulate the drawing action of an actual smoker in lighting a cigarette and thereby promote the uniform lighting of the cigarette. This suction is effected by the return movement of the plunger 22 towards the right, as viewed in Fig. 8 for instance, after it passes the point of connection of the tube 26.

Accordingly, assuming that the plunger 22 is withdrawn to a point beyond the connection of tube 26, the time required for the plunger to return from its extreme rearward position to the point of connection of the tube 26, represents the period allowed for heating of the coil 10 before the suction effect is initiated through the tube 26. This suction effect will continue until the plunger 22 reaches its extreme position at the right-hand end of the cylinder, as viewed in Fig. 6 for instance. The ratio between the time allowed for the heating of the coil 10 and that for the suction effect, may be varied by means of suitable adjustment for changing the limit of rearward movement of the plunger 22. In the present form of the device, I have indicated the stop 30 which has adjustable screw-threaded engagement within the rear end of the cylinder 23 and through which the plunger rod 24 extends so as to limit the rearward movement of the plunger 22. Such adjustment may be effected by means of the knurled end 31 of the adjustable stop means 30. A lock ring 30a may also be provided.

The facing 22a of leather upon the plunger 22 will permit ready withdrawal of the plunger; and likewise it will permit also the return movement of the plunger in the opposite direction in the manner described. The plunger 22 is normally drawn towards the right, as viewed in Figs. 6 and 8 for instance, by the force of the coil spring 32 which has one end connected to the center thereof and its other end anchored to the frame of the device. The spring 32 extends over the idler roller 33 mounted in the frame. The open end of the cylinder 23 has its inner surface beveled so as to provide clearance for escape of nicotine fumes past the plunger when in the position indicated in Fig. 6. There may be added a split spring ring 22b for forcing the marginal portion of the facing 22a radially outwardly beyond the end of the cylinder so as to maintain the facing in proper condition for ensuring effective engagement with the inner surface of the cylinder during operation of the plunger.

Figure 2:
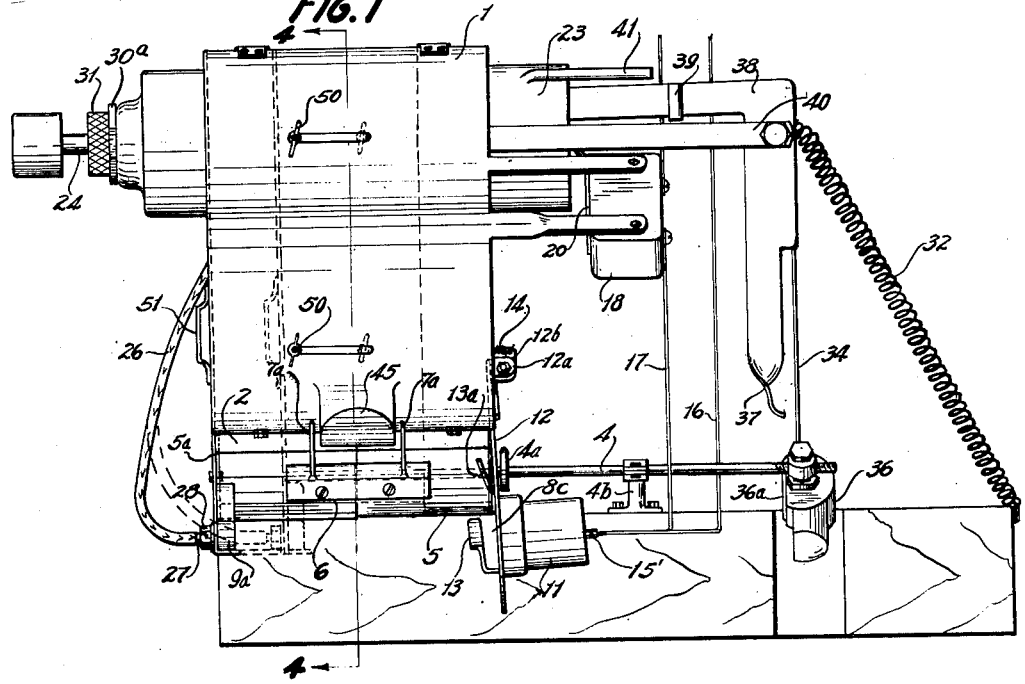
Fig. 2 is a side elevation thereof.

The center of the plunger 22 has attached thereto also a cord 34 which extends over a grooved member mounted about the axis of the roller 33 and has its other end connected to the weighted member 36 through a coil spring or other flexible form of connection 34a. The weighted member 36 is fixed upon the rotatable shaft so as to have a tendency to rotate this shaft through the force of gravity upon release of the same when the plunger 22 has returned to the right, as seen for instance in Figs. 6 and 8. When the plunger 22 is about to reach its limit of rearward movement, the inclined shoulder 36a on the member 36 will be brought into engagement with the latch member 37 which is mounted for rockable movement upon the same horizontal axis as the idler roller 33 and has a substantially horizontally extending arm 38 in operative arrangement with respect to the plunger 22, reference being had to Fig. 8. The plunger 22, in its return movement towards the right, (Figs. 2 and 6), will engage the end of the horizontal arm 38 and thus turn its companion latch arm 37 about its pivot in a clockwise direction, as seen in Fig. 2 hereof, so as to thereby withdraw the latch from engagement with the shoulder 36a and permit the weighted member 36 to fall to idle position. The horizontal arm 38 is weighted at 39 so as to cause counter-clockwise turning movement of the latch member 37 upon withdrawal of the plunger 22 from engagement therewith, as viewed in Fig. 2 hereof. The upright latch member 37 and its companion horizontal arm 38 may be recognized as a bell-crank lever which is adapted to be rotated clockwise, (Fig. 2), about its axis by the movement of the plunger 22 and counter-clockwise by the weight 39. The squared end of the arm 38, when in inclined position, will ensure proper operative engagement thereof by the plunger 22 in the manner explained. The extent of movement of the bell-crank lever 37—38 by the weight 39 may be limited by its engagement with one of the arms of the frame, as at 40, upon which the axis of this lever 37—38 is mounted; and, extending from the cylinder 23, there is a fixed stop 41 which will limit the upward movement of the arm 38 by the plunger 22 and hence will limit the return movement of the plunger 22 itself.

It is understood that approximately three-fourths of the cigarettes used in the United States are of the standard size; however, as is well known among smokers, there is what is referred to as a "king size" of cigarette. It is possible that there may be manufactured and marketed two models of this device, one for the standard size and the other for the "king size" of cigarettes. But, in order to accommodate either of these sizes of cigarettes in the same device, I have provided a means of adjustment, as indicated in the drawing. With this arrangement, the one end of the chute 1 is telescopically extensible, as are also the corresponding portions of the carrier 5 and the wall 5a which guides one end of the cigarette and also supports the receiving means for the mouth-end of the cigarette. These parts have telescopic means of extension including the pin and slot interengagement indicated by reference numeral 50. The tube 26 may be made of copper or rubber so as to permit accommodation of the same according to the position occupied by the adjustable parts. There may be provided a handle 51 upon the end wall of the telescoping inner part of the chute or container so as to facilitate manipulation of the same in the manner explained. Such adjustment involves merely the loosening of the wing nuts on the screw-threaded pins which are mounted upon the inner telescoping part of the container and extend out through the slots provided in the outer part of the container, and the tightening of the same after making the adjustment desired in the size of the container. In the present illustration, the full lines of the drawing are intended to indicate the extended position of the container for accommodating the "king size" of cigarette; while the standard length of cigarette will require a container of about only three-fourths the size of that for the "king size," as indicated in the drawing.

By providing a fixed bearing support 4b for the shaft 4, it is not necessary to provide any greater shaft length than that required for the standard length of cigarette, such length of shaft 4 being sufficient for proper supporting of the carrier in extended position. The trough 7 and projection 45 may be made sufficiently wide to serve, without adjustment, both for the standard and "king size" of cigarettes.

Another feature, which may or may not be used, relates to means for preventing the cigarettes from becoming too dry while in the chute 1. In those cases of constant smokers, such provision will not be necessary as the cigarettes will be used before they have time to dry out; and if there should remain a few cigarettes in the chute for a sufficiently long time to become dry, these could be removed and a fresh supply inserted. However, in case such provision against dry cigarettes appears to be desirable in the construction of this device, I have added the closure 2 which may be hinged at the lower end of the chute 1 and may close automatically either by gravity or spring means. The cigarette recess in the carrier 5 virtually serves as the bottom part of the chute 1 and the discharge outlet therefrom is closed by the closure 2. There is sufficiently close engagement between the bottom of the chute 1 and the carrier 5, at the rear of the chute, to cooperate with the closure 2 in providing a substantially complete enclosure for the bottom cigarette. As will be understood, the closure will be closed while the carrier 5 occupies idle position, as for instance in Fig. 4, the other position of these parts being indicated in Fig. 4a. The opening for filling the chute 1, whether at the top or side thereof, may be provided with a hinged closure, as for instance indicated at 1a at the top.

As the carrier 5 is rotated for the discharge of the bottom cigarette therefrom, the closure 2 will be automatically opened by engagement of the lower-most cigarette therewith. As the carrier recedes, after depositing the cigarette, the closure will assume closed position.

In order to increase the moisture-proof character of the chute or container for the cigarettes, there may be provided sealing means of suitable character, as for instance felt, between the closures 1a and 2 and the body of the chute and also between the telescopically extensible side portions of the chute.

Figure 3:
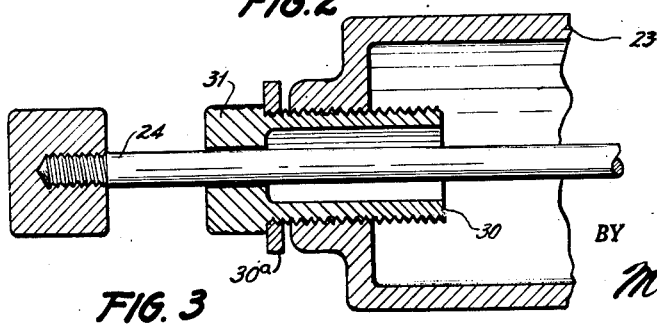
Fig. 3 is an enlarged sectional view of a part of the plunger.

Now, assuming that there is a supply of cigarettes within the chute 1, withdrawl of the plunger 22 by means of the readily accessible rod 24 will, through the cord 34, raise the weighted member 36 and will rotate the shaft 4 and the carrier 5 so as to permit the bottom-most cigarette to roll down the apron 6 and to be deposited by the lower curved trough 7 upon the ledges 8 and 9. As this operation is being completed, the electric coil 10 is moved automatically into effective lighting position with respect to the end of the cigarette; and the two upright walls 5a and 12 at the two ends of the cigarette, as it rolls down into such position, will serve as a guide means for operative engagement with the two ends of the cigarette. The parts will be held in such position by means of latch 37 which is moved by its weight 39 counter-clockwise, (see Fig. 2), as soon as the withdrawal of the plunger 22 is initiated. Also, the withdrawal of plunger 22 permits the electric switch 18 to be closed and then the heating of the electric coil 10 begins. With the parts latched in such position, the spring 32 will cause the plunger 22 to begin its return movement towards the right, as seen in Fig. 2 for instance, there being sufficient leakage of air to permit such operation. During withdrawal of the plunger 22, the air to the rear thereof was discharged out through the tube 26; and, when the plunger 22 has passed the end of the tube 26 in its return movement towards the right, as in Fig. 2 for instance, the continued movement of the plunger 22 will cause a suction through the tube 26. However, the initiation of this suction is sufficiently delayed to permit the heating of the coil 10 to the point of red heat for ensuring effective lighting of the cigarette. Thus the movement of the plunger 22 from its extreme withdrawn position to the point of the tube connection 26, represents the duration of the coil-heating period prior to the initiation of the suction for the drawing effect at the mouth-end of the cigarette. The length of the pre-heating period may be varied by means of the adjustment described, (Fig. 3); and, in this way, there may be effected a variation in the ratio between the preliminary period of heating of the coil 10 and the succeeding period of suction. The heating of the coil 10 continues, of course, during the period of suction, these two effects being terminated simultaneously upon return of the plunger 22 fully to its idle position at the right-hand end of the cylinder, referring for instance to Fig. 6, when the latch 37 is also released by the engagement of the plunger 22 with the end of the bellcrank lever 37—38. When so released, the weighted member 36 will fall by gravity and turn the shaft 4 and the cigarette-carrier 5 to idle position, indicated in Figs. 2 and 5 of the present drawings. Such engagement of the plunger 22 with the arm 33 serves also to limit the return movement of the plunger at the open end of the cylinder. The lighted cigarette will at the same time be moved upwardly but the upwardly turned projection 45 will prevent the cigarette from rolling back onto the carrier 5. Thus the trough 7 and the projection 45 together constitute a trap for the lighted cigarette which may then be removed by the user. Upon return of the cigarette-carrier 5 to such position, it will then be in position at the bottom of the chute 3 to receive another cigarette to be carried through the same operation, as just reviewed, whenever desired.

In my present device there is only one manipulation required, namely the withdrawal of the plunger rod. All of the other several operations are initiated thereby automatically in proper sequence, as above described. Furthermore, the parts of the device will automatically be returned to idle position, ready for operation again in the same simple manner whenever desired.

Although this device is especially designed and adapted for use by the driver of an automobile, with the very practical advantage of reducing to an extreme minimum the attention required to obtain a lighted cigarette while operating the automobile, yet it may be installed elsewhere with corresponding convenience; and the following claims are not to be considered as being limited to any particular installation of my present invention. In fact, by virtue of the plunger means for creating the suction effect, this device is not dependent upon the suction of an internal combustion engine but may be employed wherever desired, as for instance in the home, the office or elsewhere.

Also, while the present form of disclosure is designed for the lighting of cigarettes, it is to be understood that this invention is not so limited by may also be designed for the supplying and lighting of cigars.

The present form of the device has been actually operated with marked success; and, furthermore, it can be manufactured and sold at a price which should prove popular with those who may have need for such a device.

What I claim is:

1. A lighter for cigarettes or the like, comprising a supporting means for a cigarette or the like, a lighting means at one end of said supporting means, a suction device at the other end of said supporting means for simulating the drawing effect of a smoker upon the mouth-end of a cigarette or the like, means for holding a supply of cigarettes or the like, means whereby a cigarette or the like may be moved from said holding means to said supporting means so as to occupy operative relation to said lighting and suction means, spring means tending normally to return said moving means towards idle position, a cylinder having a plunger operatively connected to said spring means and adapted to be withdrawn for setting the same for return movement by said spring means, said suction device being operatively connected to said cylinder at a point a predetermined distance substantially in advance of the rear end thereof and adapted to be actuated by the return movement of said plunger beyond said point, operative means of connection between said lighting means and said plunger to effect actuation of said lighting means immediately upon the initiation of the withdrawal of said plunger, the parts being so constructed and arranged that said lighting means will be energized substantially prior to the actuation of said suction device.

2. The same structure as recited in claim 1 hereof and in which there is included adjustable means in the rear end of said cylinder for varying the length of stroke of said plunger at will so as to vary the time interval between the energization of the lighting means and the actuation of the suction means.

HERMAN S. CAHEN.

REFERENCES CITED

The following references are of record in the file of this patent:

UNITED STATES PATENTS

| Number | Name | Date |
|---|---|---|
| 1,796,657 | Leitz | Mar. 17, 1931 |
| 1,823,609 | Kappenberg | Sept. 15, 1931 |
| 1,971,585 | Soreng | Aug. 28, 1934 |
| 1,993,504 | Eiler | Mar. 5, 1935 |
| 2,062,701 | Cohen | Dec. 1, 1936 |
| 2,085,121 | Randazzo | June 29, 1937 |
| 2,108,376 | Copeland | Feb. 15, 1938 |
| 2,370,230 | Cheechoo | Feb. 27, 1945 |